Jan. 15, 1929. 1,698,890
C. T. McGILL
CHEMICAL FILTER AND BASE EXCHANGE SOFTENER
Filed Aug. 30, 1927  2 Sheets-Sheet 1

Inventor
Chester T. McGill
By Mason Fenwick Lawrence
Attorney

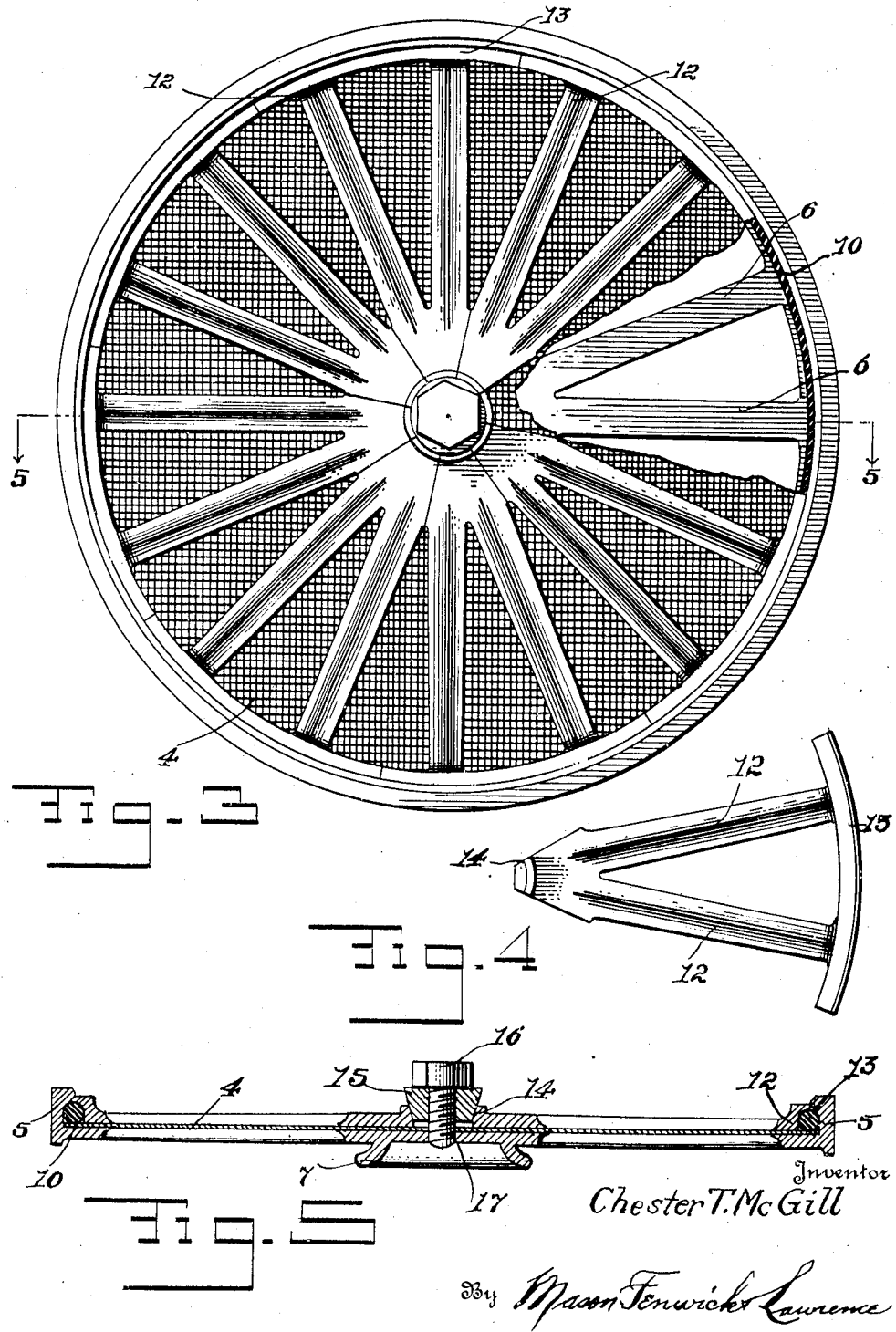

Patented Jan. 15, 1929.

1,698,890

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

CHEMICAL FILTER AND BASE-EXCHANGE SOFTENER.

Application filed August 30, 1927. Serial No. 216,455.

This invention relates to improvements in chemical filters and base exchange softeners, particularly in a device which includes a demountable or removable filter screen for use in connection with a closed or open tank, thereby permitting removal of the screen from the tank for cleansing purposes without dismantling the tank and the connections.

This application is an improvement over the inventor's copending application Serial No. 99,609, filed April 3, 1926.

An object of this invention is to provide a feeding device for regulating the application of either a chemical or a coagulant to the water before its passage through the filter screen whenever the water supply is such that it is necessary to chemically treat or coagulate the raw water before it is filtered in order to properly filter the raw water supply.

Another object of this invention is to provide an unsoftened water, chemically treated or coagulated and filtered, for drinking purposes.

A further object of this invention is to provide a chemically treated or coagulated and filtered water for passing through zeolite mineral for softening purposes.

Another object of this invention is to provide a removable filter within the tank for refiltering the softened water before it enters the service lines.

Another object of this invention is to provide means for backwashing the filter material between regenerating periods and also at regenerating periods without passing the wash water through the zeolite mineral.

A further object of this invention is to provide a filter to receive the salt for regenerating and to filter the salt and distribute the brine evenly down through the zeolite mineral.

One of the prime objects of this invention is to provide means for easily removing the filter screen for cleansing purposes without dismantling the softener tank.

Another object of this invention is to provide means for passing of hot water, steam or chemicals through the filtering material for cleansing and sanitary purposes without passing said hot water, steam or chemicals through the zeolite mineral.

Other objects of this invention will appear from the following detailed description of the device and as disclosed in the two sheets of drawings which are herewith made a part of this application.

In the drawings—

Figure 3 illustrates a plan view of the removable filter screen with a portion broken away to disclose the reinforcing arms of the filter screen rim.

Figure 4 represents a plan view of one of the removable sectional retaining members for the filter screen.

Figure 5 illustrates a sectional view of Figure 3, taken along line 5—5.

Figure 1:
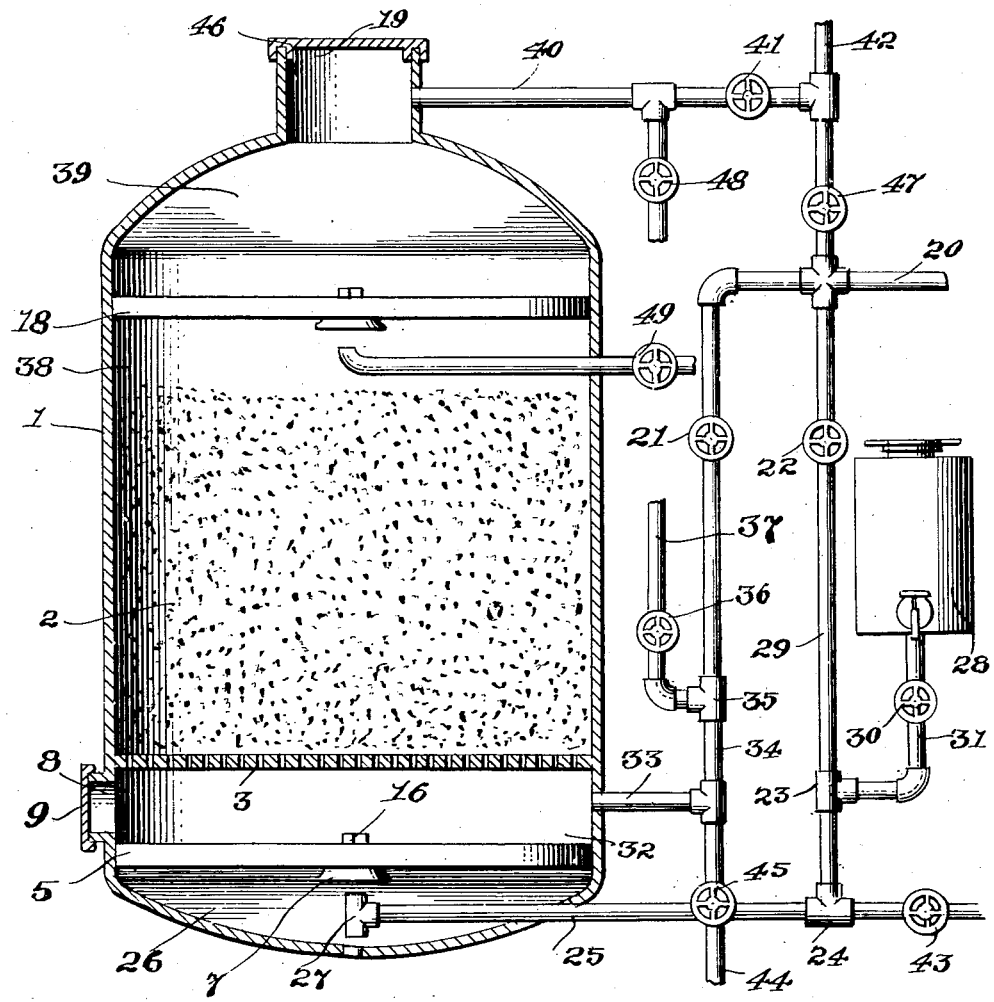
Figure 1 illustrates a vertical sectional view of the chemical filter and base exchange softener disclosing the different elements in assembled and operative relationship.

Numeral 1 designates a tank of either closed or open type, made of suitable material, adapted to receive therein zeolite or other base exchange softener material 2, which is carried within the tank 1 upon a perforated plate distributing screen 3 suitably attached to the inner circumference of the tank by means of welding or otherwise. The perforated plate 3 is located in the lower section of the tank 1 in such a manner that a removable filter screen 4 may be placed therebelow and properly spaced therefrom. The screen 4 is adapted to be held in position by means of a rim portion 5, suitably reinforced by means of arms 6. The rim 5 and integrally formed portions may be made of any suitable material, such as brass, and cast into form for being received within the tank 1 and spaced from the perforated plate 3, the rim 5 being integrally connected to the inner circumference of the tank 1 by means of welding or otherwise. The arm portions 6 on the rim 5 extend radially toward the center of the supporting rim for the screen 4; and, extending downwardly and integrally cast with the rim and supporting frame 5 near the center thereof, is an outwardly flaring portion 7 for the purpose of receiving that portion of inflowing water which flows upwardly, and spreading the water evenly to the filter.

In order to insert the screen element 4 within the tank and locate it in the desired position, a hand-hole 8 is formed in the tank 1 intermediate of the perforated plate 3 and the rim 5 of the removable filter screen, and a suitable cover 9 is provided for the hand-hole 8. The screen, being of a flexible material, can be rolled so as to be inserted through the hand-hole and placed in position upon the rim and supporting elements 6 of the filter, and after being located as desired, a cylinder gasket 10 is passed through the hand-hole 8 and located in its position around the inner circumference of the rim 5 within the notched portion 11, as disclosed in Figure 2, after which a plurality of removable clamping elements 12 are placed in position upon the screen 4, as clearly disclosed in Figure 3, each clamping element 12 being preferably provided with a segmental portion 13, formed in such a manner that when clamped into position on the screen 4, the resilient element 10 will be forced firmly into sealing position, as disclosed in Figure 2, within the notched portion 11.

Figure 2:
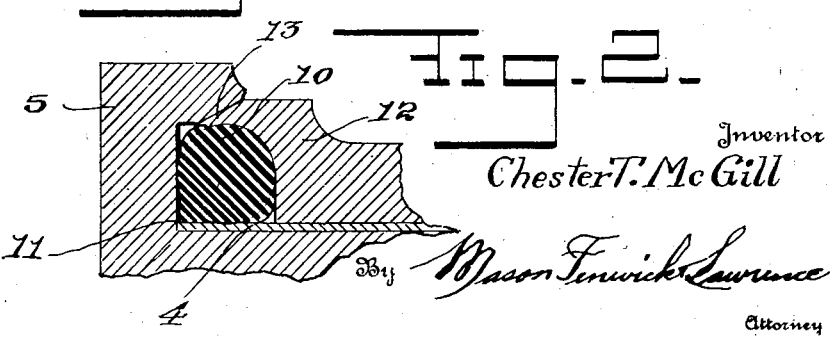
Figure 2 represents a sectional view, to an enlarged scale, of a portion of the removable filter screen rim showing in assembled relationship thereto the gasket or filter screen and retaining element.

Each clamping element 12 extends radially toward the center of the removable filter screen 4, the inner end of each clamping element 12 being formed having an inwardly and downwardly extending surface, as clearly disclosed at 14, it being apparent that a plurality of clamping elements 12, when in position, will form an inwardly inclined surface at the center of the removable filter for the purpose of receiving a cooperating element 15 having an opening therein through which set screw or bolt 16 is adapted to loosely extend, the lower end of the set screw 16 functioning to be brought into threaded relationship with the rim 5 and its integrally connected members, as at 17, thereby providing an efficient means for firmly clamping and holding the screen 4 in position on its main supports 5 and 6; also functioning to provide a means for forcing resilient gasket member 10 into sealed relationship with the rim 5 and screen 4, as disclosed in Figure 2.

Suitably spaced above the zeolite in the tank 1, a removable filter screen is preferred to be located, as disclosed at 18, the construction of which is similar to the screen above described and clearly disclosed in Figures 3 and 5; the removable filter 18 may be welded or otherwise connected to the tank 1. In order to remove or replace the screen element in the top filter 18, the fill nozzle 19 in the tank 1 may be utilized.

This invention provides a device in which the raw water enters the line 20, and in normal operation, valve 21 is closed and the water passes through valve 22, down through T 23, T 24, line 25, and delivers into bottom chamber 26 through T 27.

When waters are being used in localities where the supply carries small visible suspended particles, such as dirt, leaves, algæ growths, precipitated iron, colloidal silt and other substances, it is preferred by this invention to provide a tank 28 for supplying reagents or coagulants for properly reacting upon the substances contained in the various waters so as to bring about a ready precipitation and other advantages hereinafter described.

The chemical tank 28 is connected to supply line 29 by means of the T 23 and valve 30 is inserted in the connecting line 31, which will function to admit a regulated supply of chemicals to the raw water from the tank 28. In cases where chemicals are required and the chemical tank 28 is used, such reagents or coagulants bring about a ready precipitation as the water travels into the bottom chamber 26 of the tank 1 and passed up through the filter screen 4 into the space 32, which provides filtered and chemically coagulated water, either to be softened or unsoftened for household purposes, leading therefrom through lines 33, 34, T 35, valve 36, line 37, wherein chemically treated and filtered unsoftened water is supplied.

In order to obtain softened filtered water, the filtered water from the space 32 will pass upward through the perforated plate or screen 3, the zeolite or exchange mineral 2, into the open chamber space 38 located between the upper filter 18 and the top of the exchange mineral 2, the softened water passing through the filter screen located at 18, up through chamber 39, through the fill nozzle 19, line 40, valve 41, line 42 to the soft water supply.

Attention is called to the fact that in localities where it is necessary to chemically treat the raw water or coagulate raw water before filtration, the water is so treated and filtered, after which the water is softened, then the softened water is refiltered before passing to the soft water service line 42.

One of the main advantages of this system is the provision for cleansing and sterilizing the filter material. While the system is in operation it is possible to wash the bottom filtering cloths in rim 5 without interfering with the furnishing of softened water; and in order to backwash the filter cloth 4 in the rim 5, valve 22 is closed, valves 21 and 43 are opened. This allows the raw water to pass through valve 21, lines 34 and 33 into chamber 32, reversing the current of the water through the filter cloth 4 in the rim 5, washing the accumulated sediment from filter cloth into fitting 27, line 25, T 24, and valve 43. Usually, from one to three minutes is sufficient to thoroughly cleanse this filter material, then valve 43 is closed, valve 21 closed, and valve 22 opened, and the filter is again in operation, this result being attained without passing the wash water through the zeolite material.

The sterilization of the screen 4 in the rim 5 may be accomplished by admitting hot water or steam through line 44, valve 45, line 33, chamber 32, down through filter cloth or screen and out drain at valve 43.

For further cleansing and sterilizing or replacing, the screen may be easily removed through hand-hole 8 by releasing the set screw or bolt 16, clamping members 12 and lifting the resilient gasket member 10 from its position, after which the screen 4 may be easily rolled and removed through the hand-hole 8.

During regenerating periods a further process may be used to sterilize chamber 26, filter cloth 4 in rim 5, without removing the filter cloth, by preparing a suitable solution in tank 28, allowing the solution to pass through valve 30, T 23, T 24, line 25 and into chamber 32, through line 33, valve 45, line 44 to the drain. This provides a sterilizing chemical for the filter screen 4 which does not pass through the zeolite mineral, and the chemical solution may be easily washed out as above explained.

Regarding the regeneration, salt or brine solution is admitted through fill nozzle 19 or pipe line 40, valve 48 above the filter screen 4 in 18. Valve 45 is opened sufficiently to carry the brine solution out below the zeolite mineral and above the filter screen 4 in rim 5. After the salt or brine solution is admitted, cap 46 is replaced on the fill nozzle 19 and valves 47 and 41 are opened, allowing the raw water to pass into the top of the system carrying the brine solution down evenly through the filter means 18 and through the zeolite mineral and out through the drain 44. After a sufficient amount of water has passed from the softener through valve 45, the completion of the regeneration is made by closing valves 41 and 45, opening valve 22, admitting water into chamber 26 through fitting 27, passing it up through filter member 5, through space 32, up into and through the zeolite mineral, passing it through filter member 18 and out through valve 48, valve 49 being used for the removal of scum and for testing the water for hardness during regenerating periods.

In normal operation, the system, when it is furnishing softened water and filtered, chemically treated, unsoftened water, valves 41, 22 and 36 are open, all other valves are closed excepting 30 which is regulated according to the amount of chemical reagent required to treat the raw water.

In the practical use to which this device may be adapted, attention is called to the fact that in many localities the water supply carries small visible suspended particles, such as dirt, leaves, algæ growths, precipitated iron, colloidal silt and other substances. Previous means for clarification of such waters have been to either install a settling basin to settle out the visible suspended particles, the installation of a pressure or gravity sand filter to filter out such particles, or probably the combination of both.

It is well known that in public buildings, hospitals, hotels and institutions, as well as in power plants, floor space is oftentimes very limited, and forbids the installation of equipment requiring considerable space.

The device, according to the invention herewith described and claimed, makes it possible to install a small tank with the removable screen at the bottom to apply the necessary chemical or coagulant to precipitate the suspended matter in suitable form for filtration, and the mere passage of the filter water through the screen will clarify it sufficiently for use.

Many waters, when taken from their source, are clear and free from suspended matter, and upon standing, become cloudy due to the oxidation of the ferrous carbonate to ferric hydroxide, and such waters, when treated, with a small amount of tri-sodium phosphate, immediately precipitate out the iron in the tank and the sediment is collected on the filter screen.

Other waters, such as surface waters, carry what is known as colloidal silt, a finely divided salt with a specific gravity so close to that of water that the silt will not settle out except after a long period of sedimentation. With such waters, the addition of a small amount of alum sulphate or iron sulphate along with lime, will coagulate the colloidal silt in the tank and the substance will be filtered out in the filter screen.

In many city water supplies, either dirt in the city mains or the oxidized iron from the water mains, causes a cloudy condition, and with such waters, either filtration through the removable screen or the addition of a coagulating material and filtration through the screen will clarify the supply.

The device, according to this invention, consists, therefore, broadly, of the removable filter screen, a closed or open tank, and a chemical regulator to apply either a coagulant or chemical treatment to the water, and of the furnishing of chemically treated, coagulated and filtered unsoftened water and the chemically treated, coagulated, filtered, softened water. The operation of this equipment would be either under pressure or under gravity flow. It is to be understood that alterations and substitutions may be made in the above disclosure within the scope of the appended claims without affecting the merits of this invention.

What I claim is:

1. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, and means for treating the raw water within the chamber.

2. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, and means for treating the raw water within the chamber, comprising a tank arranged in open communication with the raw water supply.

3. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, and means for treating the raw water within the chamber, comprising a tank arranged in open communication with the raw water supply, a suitable chemical treatment in the tank and means for supplying the treatment to the chamber.

4. A filter comprising a tank, a filter screen within the tank, means for supporting the filter screen consisting of a rim member suitably fastened to the tank, removable clamping elements in cooperation with the rim member, the filter screen being adapted to be held in operative relationship therebetween, means for bringing the clamping members under pressure for holding the filter screen in position.

5. A filter comprising a tank, a filter screen within the tank, means for supporting the filter screen consisting of a rim member suitably fastened to the tank, removable clamping elements in cooperation with the rim member, the filter screen being adapted to be held in operative relationship therebetween, means for bringing the clamping members under pressure for holding the filter screen in position, a gasket member arranged between the rim and clamping elements in such a manner that when the clamping elements are brought under tension the gasket will function to bring the filter screen and rim member into sealed relationship.

6. A filter comprising a tank, a filter screen within the tank, means for supporting the filter screen consisting of a rim member suitably fastened to the tank, removable clamping elements in cooperation with the rim member, the filter screen being adapted to be held in operative relationship therebetween, means for bringing the clamping members under pressure for holding the filter screen in position, a gasket member arranged between the rim and clamping elements in such a manner that when the clamping elements are brought under pressure the gasket will function to bring the filter screen and rim member into sealed relationship, means for removing the filter screen from the tank consisting of a hand-hole.

7. A filter comprising a tank, a filter screen within the tank, means for supporting the filter screen consisting of a rim member suitably fastened to the tank, removable clamping elements in cooperation with the rim member, the filter screen being adapted to be held in operative relationship therebetween, means for bringing the clamping members under pressure for holding the filter screen in position, a gasket member arranged between the rim and clamping elements in such a manner that when the clamping elements are brought under pressure the gasket will function to bring the filter screen and rim member into sealed relationship means for removing the filter screen from the tank consisting of a hand-hole, a second screen and supporting member arranged in spaced relationship within the tank to the first named screen.

8. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, and means for treating the raw water within the chamber, a filter member arranged within the tank in spaced relationship to the top of the base exchange mineral for the purpose of refiltering the water after passing through the base exchange mineral and regulating the flow thereof.

9. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for supplying clarified, filtered and unsoftened water.

10. A filter comprising a tank, service lines leading from the tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for filtering the softened water and delivering softened water to the service lines.

11. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for testing the water in the regeneration.

12. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for drawing off the scum above the base exchange mineral and securing samples of the water.

13. A base exchange softener comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for backwashing the raw water filter while the softener is in operation without passing the wash water through the base exchange mineral.

14. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for backwashing the raw water filter with hot water or steam without passing the hot water or steam through the base exchange mineral.

15. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for chemically sterilizing the raw water chamber and the raw water filter without passing the chemicals through the base exchange mineral.

16. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for adding salt to the tank for regenerating and filtering the brine solution before it passes through the base exchange mineral.

17. A filter comprising a tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for adding brine solution and filtering the brine solution before it passes through the base exchange mineral.

18. A filter comprising a tank, service lines leading from the tank, a perforated plate within the tank, base exchange mineral supported by the plate, a filter member arranged in spaced relationship to the perforated plate, a chamber below the filter member, means for delivering the raw water into the chamber and through the filter into the space between the perforated plate and filter member, means for treating the raw water within the chamber, and means for furnishing unsoftened water to the service lines at regenerating periods.

19. In a base exchange water softener, a tank, a raw water filter, a soft water filter, base exchange mineral within the tank, distributing and supporting material for the base exchange mineral, a water supply connection to the tank, a fill nozzle for receiving salt, connections to the tank for receiving the brine solution, and for discharging brine solution between the raw water filter and distributing material, connections for receiving and discharging hot water, steam, or sterilizing liquids without passing them through the base exchange mineral, means for supplying filtered unsoftened water, and treated filtered unsoftened water, means for supplying filtered softened water, means for supplying treated filtered softened water, means for washing the raw water filter and supplying softened filtered water at the same time, means for back-washing the filtering material without passing the wash water through the base exchange mineral, means for passing the regenerating liquids through the base exchange mineral without passing the solution through the raw water filter, means for removing the raw water filter and soft water filter without dismantling the softener tank, means for adding liquids for chemically treating and coagulating the raw water supply before the raw water passes through the filtering material.

In testimony whereof I affix my signature.

CHESTER T. McGILL.